(12) United States Patent
Lim

(10) Patent No.: US 10,284,687 B2
(45) Date of Patent: May 7, 2019

(54) METHOD AND SYSTEM FOR PROCESSING LONG-POLLING

(71) Applicants: NHN Entertainment Corporation, Seongnam-si (KR); NHN Studio629 Corporation, Seongnam-si (KR)

(72) Inventor: Chuljae Lim, Seongnam-si (KR)

(73) Assignees: NHN Entertainment Corporation, Seongnam-si (KR); NHN Studio629 Corporation, Seongnam-si (KR)

(*) Notice: Subject to any disclaimer, the term of this patent is extended or adjusted under 35 U.S.C. 154(b) by 144 days.

(21) Appl. No.: 15/413,917

(22) Filed: Jan. 24, 2017

(65) Prior Publication Data

US 2017/0214770 A1    Jul. 27, 2017

(30) Foreign Application Priority Data

Jan. 25, 2016  (KR) .................. 10-2016-0008974

(51) Int. Cl.
  *H04L 29/06*  (2006.01)
  *H04L 29/08*  (2006.01)
  *G06F 15/173*  (2006.01)
  *H04L 12/26*  (2006.01)

(52) U.S. Cl.
  CPC .............. *H04L 67/42* (2013.01); *H04L 67/02* (2013.01); *H04L 67/26* (2013.01)

(58) Field of Classification Search
  USPC ......................................................... 709/203
  See application file for complete search history.

(56) References Cited

U.S. PATENT DOCUMENTS

| 7,444,508 B2 * | 10/2008 | Karjala ............... H04L 63/0272 713/155 |
| 7,448,080 B2 * | 11/2008 | Karjala ............... H04L 41/0806 379/901 |
| 9,058,392 B1 * | 6/2015  | Pennock ............. G06F 16/9535 |
| 9,088,622 B2   | 7/2015  | Erbe |

(Continued)

FOREIGN PATENT DOCUMENTS

| KR | 10-2000-0042217 | 7/2000 |
| KR | 10-2015-0006463 | 1/2015 |

OTHER PUBLICATIONS

Minseok Choi, "Comparative Study about Two-way Communication Methods for Web Applications—focused on Games," Journal of the Korean Society for Computer Game, Dec. 30, 2015, pp. 45-53, vol. 28, No. 4, Korean Society for Computer Game.

(Continued)

*Primary Examiner* — Jude Jean Gilles
(74) *Attorney, Agent, or Firm* — H.C. Park & Associates, PLC

(57) ABSTRACT

A method of processing, at a web server, a long-polling between a client and a service server configured to provision a service to the client over a network includes: receiving, at the web server, a poll request from the client; transmitting, via the web server, the poll request to the service server; receiving, at the web server, a poll reply to the poll request from the service server; generating, at the web server, webpage data based on the data in the poll reply; and transmitting, via the web server, the webpage data to the client as the poll reply. The poll reply received at the web server includes data to be applied in association with the client.

20 Claims, 8 Drawing Sheets

(56) References Cited

U.S. PATENT DOCUMENTS

| | | | |
|---|---|---|---|
| 9,380,076 B1* | 6/2016 | Juvekar | H04L 63/101 |
| 9,430,036 B1* | 8/2016 | Kominac | G06T 11/20 |
| 2003/0046587 A1* | 3/2003 | Bheemarasetti | H04L 63/0272 |
| | | | 726/4 |
| 2003/0195984 A1* | 10/2003 | Zisapel | G06F 9/505 |
| | | | 709/238 |
| 2013/0173756 A1* | 7/2013 | Luna | H04L 43/0876 |
| | | | 709/219 |
| 2013/0296048 A1 | 11/2013 | Jeffery et al. | |
| 2014/0047413 A1* | 2/2014 | Sheive | H04L 65/403 |
| | | | 717/110 |
| 2015/0310126 A1* | 10/2015 | Steiner | G06F 17/2247 |
| | | | 715/204 |

OTHER PUBLICATIONS

Notification of Reason for Refusal dated Nov. 30, 2016, in Korean Patent Application No. 10-2016-0008974.

* cited by examiner

METHOD AND SYSTEM FOR PROCESSING LONG-POLLING

CROSS-REFERENCE TO RELATED APPLICATION

This application claims priority from and the benefit of Korean Patent Application No. 10-2016-0008974, filed on Jan. 25, 2016, which is hereby incorporated by reference for all purposes as if fully set forth herein.

BACKGROUND

Field

One or more exemplary embodiments relate to methods and systems for processing long-polling.

Discussion

In a conventional client-server environment, a server and a client communicate with one another using one or more socket connections. For example, Korean Patent Application Publication No. 10-2000-0042217, filed on Dec. 24, 1998, which is hereby incorporated by reference for all purposes as if fully set forth herein, discloses a method for setting up a socket connection in a client/server system. A socket connection may be utilized for communication in association with an online game, as will become more apparent below.

For instance, a client may proceed with an online game by communicating with a game server through a client program that includes game logic. The game logic included in the client program, however, may increase a probability of being hacked. To this end, even for a small screen change on a game, a patch of a client program or redistribution of the client program may be required. Also, from the perspective of the game server, there is a persistent issue according to modulation of the client program. Since the game server directly connects with the client, a relatively large amount of resources may be used to manage the connection. As such, communications using existing socket structures may not be free from hacking issues and relatively large amounts of resources may be expended to patch or replace a protocol. It is, therefore, difficult to dynamically modify a service during runtime.

The above information disclosed in this Background section is only for enhancement of understanding of the background of the inventive concepts, and, therefore, it may contain information that does not form the prior art that is already known to a person of ordinary skill in the art.

SUMMARY

One or more exemplary embodiments provide long-polling methods and systems in which a web server may provide a service by processing a long-polling between a client and a service server that provides the service to the client over a network.

Additional aspects will be set forth in the detailed description which follows, and, in part, will be apparent from the disclosure, or may be learned by practice of the inventive concepts.

According to one or more exemplary embodiments, a method of processing, at a web server, a long-polling between a client and a service server configured to provision a service to the client over a network includes: receiving, at the web server, a poll request from the client; transmitting, via the web server, the poll request to the service server; receiving, at the web server, a poll reply to the poll request from the service server; generating, at the web server, webpage data based on the data in the poll reply; and transmitting, via the web server, the webpage data to the client as the poll reply. The poll reply received at the web server includes data to be applied in association with the client.

According to example embodiments, a non-transitory computer-readable storage medium may include one or more sequences of one or more instructions that, in response to being executed, cause at least one apparatus to process a long-polling between a client and a service server configured to provision a service to the client over a network. Processing of the long polling includes: receiving, at the at least one apparatus, a poll request from the client; transmitting, via the at least one apparatus, the poll request to the service server; receiving, at the at the at least one apparatus, a poll reply to the poll request from the service server; generating, at the at the at least one apparatus, webpage data based on the data in the poll reply; and transmitting, via the at the at least one apparatus, the webpage data to the client as the poll reply. The poll reply received at the at the at least one apparatus includes data to be applied in association with the client.

According to one or more exemplary embodiments, a long-polling processing system of a web server configured to process a long-polling between a client and a service server configured to provision a service to the client over a network includes: at least one processor; and at least one memory comprising one or more sequences of one or more instructions that, in response to being executed by the at least one processor, cause the long-polling processing system at least to: control the web server to receive a poll request from the client; control the web server to transmit the poll request to the service server; control the web server to receive a poll reply to the poll request from the service server; control the web server to generate webpage data based on the data in the poll reply; and control the web server to transmit the webpage data to the client as the poll reply. The poll reply received at the web server includes data to be applied in association with the client.

According to one or more exemplary embodiments, a web server may generate webpage data for a configuration of a service screen by processing a long-polling between a client and a service server that provides a service to the client over a network, and may provide the generated webpage data to the client. Accordingly, it is possible to eliminate (or at least reduce) hacking issues with respect to the client itself and to enable relatively easy installation of an additional patch and/or server in real time, e.g., dynamically. Dynamic modification to a protocol at a service server is also readily possible in association with one or more exemplary embodiments.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
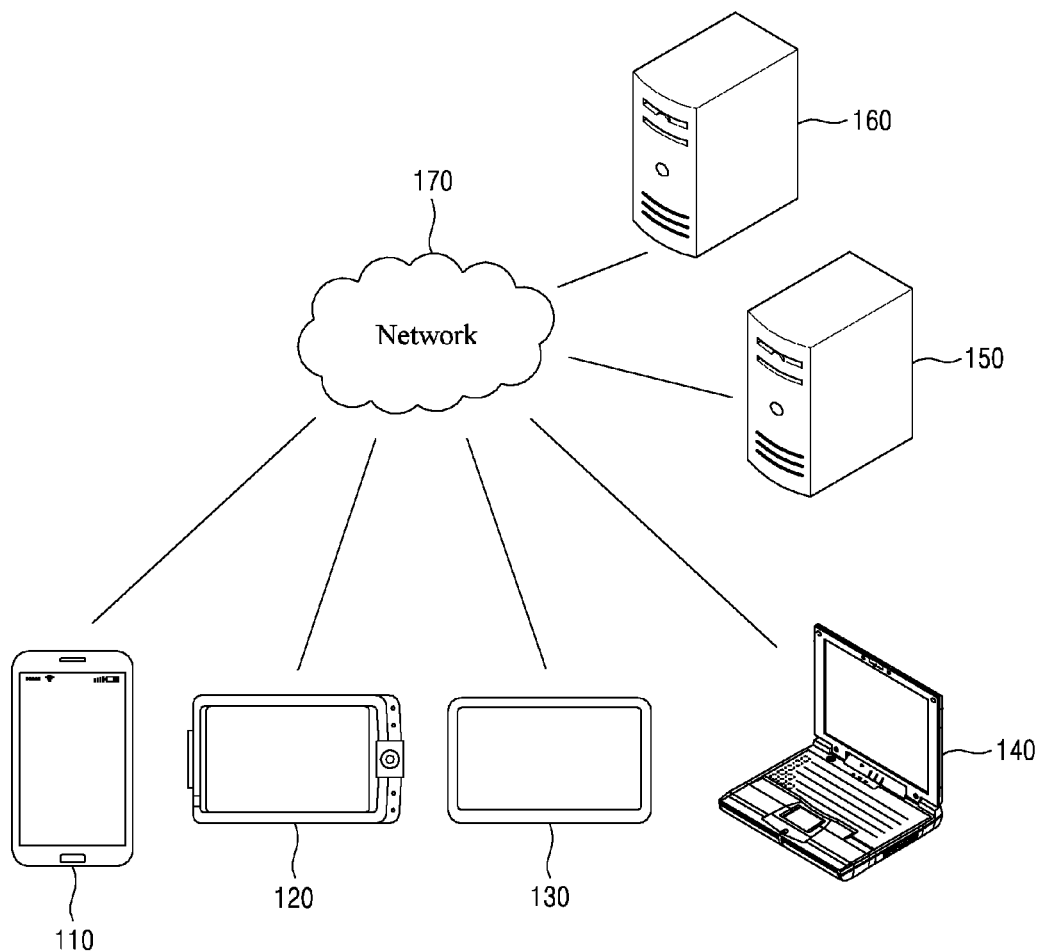
FIG. 1 is a block diagram of a network environment, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. To this end, various exemplary embodiments may be different, but do not have to be exclusive. For example, specific shapes, configurations, and characteristics of an exemplary embodiment may be implemented in another exemplary embodiment without departing from the spirit and the scope of the present disclosure.

Unless otherwise specified, the illustrated exemplary embodiments are to be understood as providing exemplary features of varying detail of various exemplary embodiments. Therefore, unless otherwise specified, the features, blocks, components, modules, elements, and/or aspects of the various illustrations may be otherwise combined, separated, interchanged, and/or rearranged without departing from the disclosed exemplary embodiments. Further, in the accompanying figures, the size and relative sizes of blocks, components, modules, elements, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like features, blocks, components, modules, elements, and/or aspects.

When a feature, block, component, module, element, and/or aspect is referred to as being "connected to" or "coupled to" another feature, block, component, module, element, and/or aspect, it may be directly connected to or coupled to the other feature, block, component, module, element, and/or aspect or one or more intervening features, blocks, components, modules, elements, and/or aspects may be present. When, however, a feature, block, component, module, element, and/or aspect is referred to as being "directly connected to" or "directly coupled to" another feature, block, component, module, element, and/or aspect, there are no intervening features, blocks, components, modules, elements, and/or aspects present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated f features, blocks, modules, integers, steps, operations, elements, components, groups, and/or aspects thereof, but do not preclude the presence or addition of one or more other features, blocks, modules, integers, steps, operations, elements, components, groups, and/or aspects thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is customary in the field, exemplary embodiments are described, and illustrated in the drawings, in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of exemplary embodiments may be physically separated into two or more interacting and discrete blocks, units, and/or modules without departing from the spirit and scope of the inventive concepts. Further, the blocks, units, and/or modules of exemplary embodiments may be physically combined into more complex blocks, units, and/or modules without departing from the spirit and scope of the inventive concepts.

FIG. 1 is a block diagram of a network environment, according to one or more exemplary embodiments.

Referring to FIG. 1, the network environment includes a plurality of electronic devices 110, 120, 130, and 140, a plurality of servers 150 and 160, and a network 170. Although specific reference will be made to this particular implementation, it is also contemplated that the network environment may embody many forms and include multiple and/or alternative components and facilities. For example, it is contemplated that a number of the electronic devices and/or servers (or additional and/or alternative devices) may be combined, located in separate structures, and/or separate locations. As such, exemplary embodiments are not limited to or by the network environment of FIG. 1.

According to one or more exemplary embodiments, each of the plurality of electronic devices 110, 120, 130, and 140 may be a fixed terminal or a mobile terminal configured as a computing device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), etc. The electronic device 110 may communicate with other electronic devices 120, 130, and/or 140 and/or at least one of the servers 150 and 160 over the network 170 in a wired communication manner and/or in a wireless communication manner.

The communication scheme of the network environment is not limited and may include any suitable communication method that uses, for instance, wireless near-field communication between devices, a communication network, for example, a mobile communication network, the wired Internet, the wireless Internet, a broadcasting network, etc. It is noted that the network 170 may include one or more of the aforementioned communication mediums or may be communicatively coupled to at least one network including one or more of the aforementioned communication mediums. For example, the network 170 may include at least one of network topologies that include networks, such as a personal area network (PAN), a local area network (LAN), a campus area network (CAN), a metropolitan area network (MAN), a wide area network (WAN), a broadband network (BBN), and the like. Also, the network 170 may include at least one of network topologies that include a bus network, a star network, a ring network, a mesh network, a star-bus network, a tree or hierarchical network, and the like. It is contemplated, however, that exemplary embodiments are not limited thereto or thereby.

Servers 150 and 160 may be configured as computing devices or a plurality of computing devices that provides one or more sequences of one or more instructions, codes, files, contents, services, etc., through communication with at least one of the plurality of electronic devices 110, 120, 130, and/or 140 via the network 170. In this manner, servers 150 and 160 may also manage one or more storages, e.g., file servers, print servers, networking servers, etc., in a distributed fashion such that tasks, workloads, etc., may be partitioned between resources.

For example, the server 160 may provide a file for installing an application to the electronic device 110 connected to the server via the network 170. In this manner, the electronic device 110 may install the application using the file provided from the server 160. Also, the server 160 may access the server 150 under control of at least one program, for example, a browser, the installed application, an operating system (OS) of the electronic device 110, etc., and may use a service or content provided from the server 150. For instance, in response to a service request message transmitted via the application from the electronic device 110 to the server 150 over the network 170, the server 150 may transmit a response including information (e.g., instructions, code, etc.) corresponding to the service request message to the electronic device 110. In this manner, the electronic device 110 may provide, via the application or under control of the application, content to a user by configuring and displaying a screen corresponding to the information. As another example, the server 150 may set (or establish) a communication session for a messaging service, and, as such, may route a message transmission and reception between one or more of the plurality of electronic devices 110, 120, 130, and/or 140 through the set communication session.

According to one or more exemplary embodiments, the server 160 may be a service server that provides a service to the plurality of electronic devices 110, 120, 130, and/or 140 that are clients, e.g., registered clients, such as subscribers, of the service. The server 150 may be a web server configured to process long-polling between the server 160 and the clients, e.g., an application running on an electronic device, such as one of the plurality of electronic devices 110, 120, 130, and/or 140.

Figure 2:
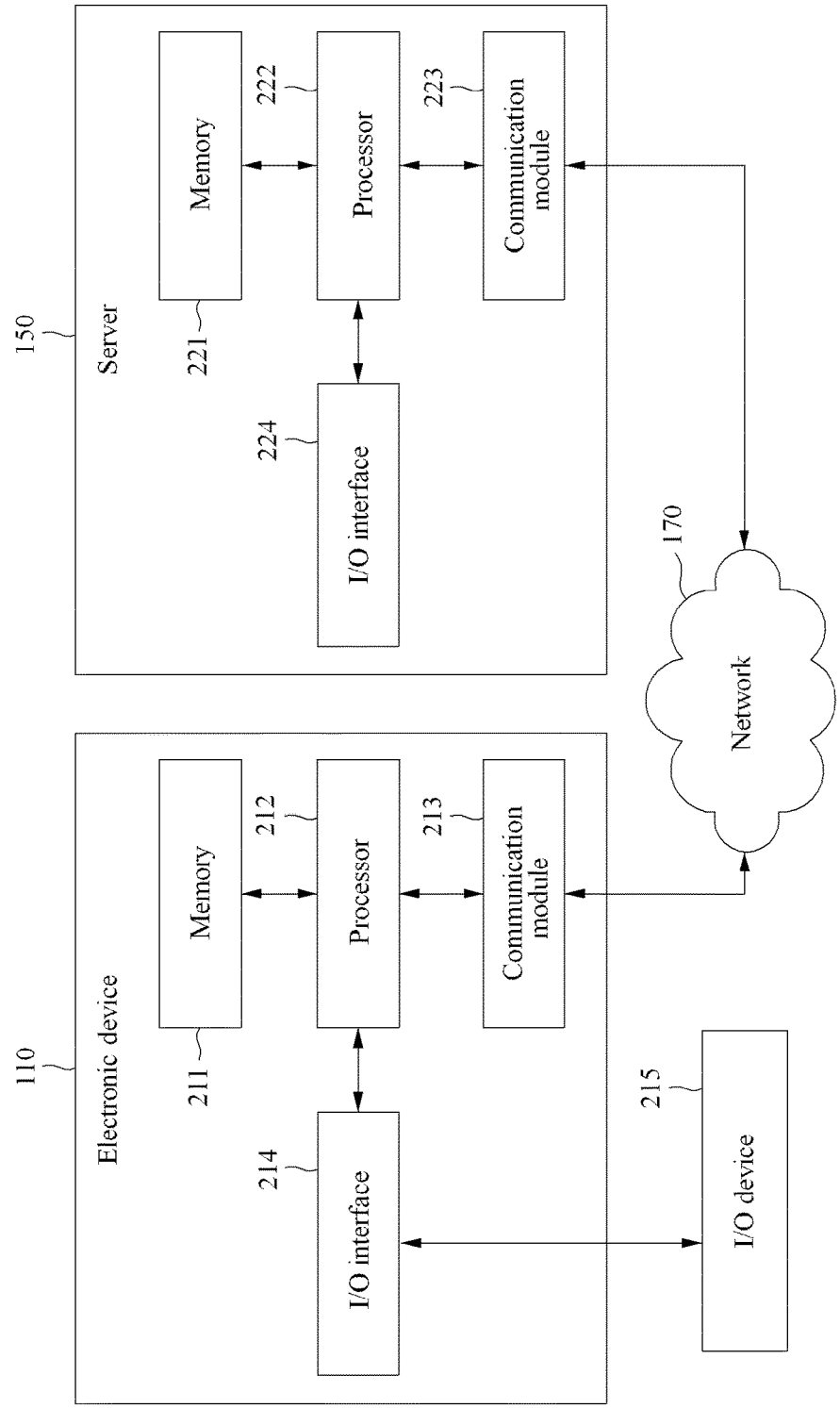
FIG. 2 is a block diagram of an electronic device and a server, according to one or more exemplary embodiments.

FIG. 2 is a block diagram of an electronic device and a server, according to one or more exemplary embodiments. Namely, FIG. 2 illustrates a configuration of the electronic device 110 as an example of a single electronic device and illustrates a configuration of the server 150 as an example of a single server. The same or similar constituent elements may be applicable to other electronic devices (e.g., electronic devices 120, 130, and/or 140) and other servers (e.g., server 160), etc.

Referring to FIG. 2, the electronic device 110 may include a memory 211, a processor 212, a communication module 213, and an input/output (I/O) interface 214. The server 150 may include a memory 221, a processor 222, a communication module 223, and an I/O interface 224. Although specific reference will be made to these particular implementations of electronic device 110 and server 150, it is also contemplated that electronic device 110 and/or server 150 may embody many forms and include multiple and/or alternative components. For descriptive convenience, the various components of electronic device 110 and sever 150 will be collectively described, but referred to in the singular. It is contemplated, however, that a feature described with respect to a component of the electronic device 110 may be performed by a component of the server 150, or vice versa. It is also contemplated that the feature may be distributed between the electronic device 110 and the server 150.

The memory 211, 221 may store data processed by the processor 212, 222, as well as store data input via the I/O interface 214, 224. It is also contemplated that an OS and one or more sequences of one or more instructions, codes, files, contents, services, etc., may be stored to the memory 211, 221, such as, for example, the above-noted code for a browser or an application installed and executed on the electronic device 110. In this manner, the memory 211, 221 may be (or include) at least one of a volatile storage and a non-volatile storage that includes various types of storages that retain stored data regardless power on/off conditions. In this manner, the memory 211, 221 may be a permanent mass storage device. It is also noted that the memory 211, 221 may operate in response to control of the processor 212, 222. Further, the memory 211, 221 may include an interface for controlling storage of information.

According to one or more exemplary embodiments, the memory 211, 221 may include at least one of a static random-access memory (SRAM), a magnetoresistive random-access memory (MRAIVI), an embedded dynamic random-access memory (embedded DRAM), etc. Additionally (or alternatively), the memory 211, 221 may include at least one of various types, such as a flash memory, a hard disk, a read-only memory (ROM), a programmable read-only memory (PROM), an electrically programmable read-only memory (EPROM), an electrically erasable and programmable read-only memory (EEPROM), a phase-change read-only memory (PRAM), a magnetic read-only memory (MRAM), a resistive read-only memory (RRAM), a ferroelectric read-only memory (FRAM), etc. It is noted, however, that one or more of the above-noted constitute software elements may be loaded from another computer-readable storage medium separate from the memory 211, 221 using any suitable drive mechanism. To this end, the memory 211, 221 and/or the other computer-readable storage medium may include, for example, a floppy disk, a flexible disk, a hard disk, a magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, any other memory chip or cartridge, or any other medium from which information may be read by, for example, the processor 212, 222.

According to one or more exemplary embodiments, software constituent elements may be loaded to the memory 211, 221 via the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing arithmetic operations, logic operations, I/O operations, etc. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120, or another server, for example, the server 160. For example, the processor 212 of the electronic device 110 may transfer a request, for example, a streaming service request for content, created based on program code stored in a storage device, such as the memory 211, to the server 150 over the network 170 under control of the processor 212 and the communication module 213. As another example, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, a joystick, etc., and an output device may include a device, such as a display for displaying a communication session of an application. As another example, the I/O interface 214, 224 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or another electronic device (e.g., electronic device 120), or may display content on a display through the I/O interface 214.

According to one or more exemplary embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and/or the like. For instance, the electronic device 110 may be a cellular phone (e.g., smartphone), such that the electronic device 110 may be configured to further include a variety of other constituent components, such as, for example, an acceleration sensor or a gyro sensor generally included in a smartphone, a camera, various types of buttons or a button using a touch panel, an I/O port, and the like.

In one or more exemplary embodiments, the server 160 may be a service server that provides a service to the plurality of electronic devices 110, 120, 130, and/or 140 that are clients. The server 150 may be a web server that processes a long-polling between the server 160 and clients. As used herein, a polling scheme is not a push scheme in which a server transmits data to a client for data reception, but a scheme in which a client requests data from a server. To this end, a long-polling scheme may indicate a pull scheme in which a connection is terminated and a reconnection is established after a determined amount of time has elapsed.

Figure 3:
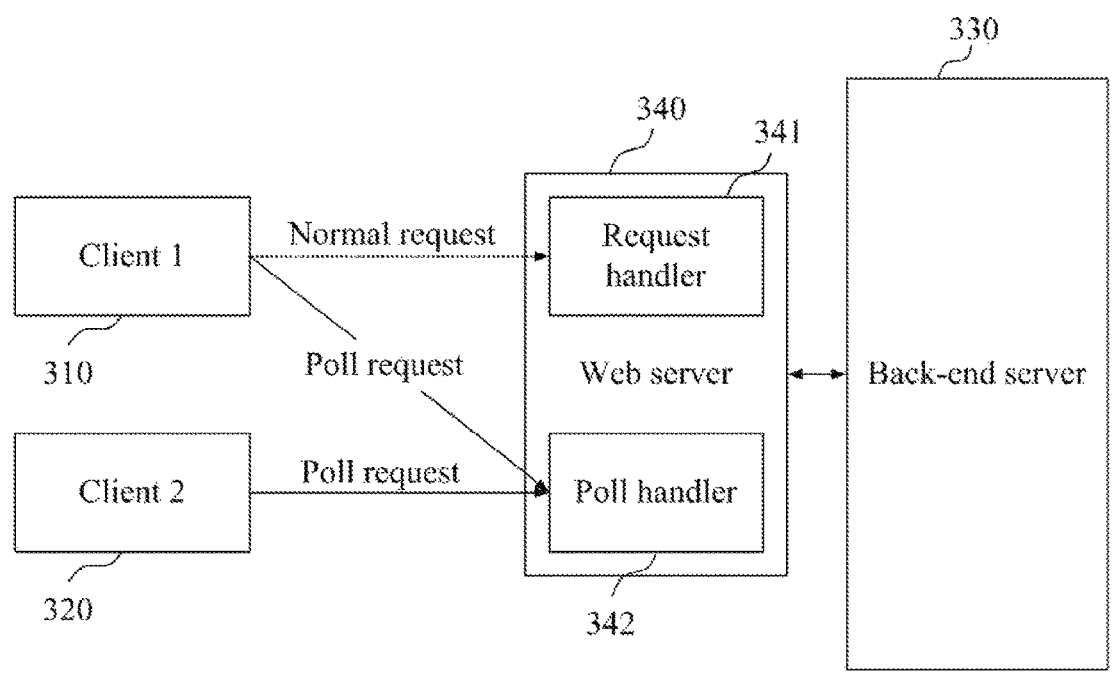
FIG. 3 is a block diagram of a client-server environment including a web server, according to one or more exemplary embodiments.

FIG. 3 is a block diagram of a client-server environment including a web server, according to one or more exemplary embodiments. For instance, FIG. 3 illustrates a back-end server 330 configured to provide a service to a first client (e.g., client 1) 310 and a second client (e.g., client 2) 320 and a web server 340 configured to process a long-polling between the first client 310 and the second client 320, and the back-end server 330. For example, the back-end server 330 may be configured to provide a game service. In this manner, the back-end server 330 may be an actual service server configured to provide the game service, such as a game server, a database (DB) server, a ranking server, and the like, or a combination of service servers.

In one or more exemplary embodiments, the first client 310 and the second client 320 may utilize a service of the back-end server 330 through the web server 340. To this end, each of the first client 310 and the second client 320 may transmit a poll request to the web server 340 through any suitable web protocol. The web server 340 may manage the poll request received through a poll handler 342, and may transfer the poll request to the back-end server 330.

It is noted that a general web server may passively respond only in response to reception of a request. In this manner, the web server 340 may also have a passive feature of providing only a response to a request. However, in the case of a service that includes frequent data delivery, such as an online game service, it is relatively difficult to provide such a service by simply using a request and a response scheme.

According to one or more exemplary embodiments, a poll request may be used and distinguished from a normal request for the first client 310 and the second client 320 to request the back-end server 330 for the service. The poll request is a request used for the first client 310 and the second client 320 to maintain connection with the back-end server 330. The poll requests of the first client 310 and the second client 320 may be transferred to the back-end server 330 through the web server 340. The back-end server 330 may be on standby for a determined period of time instead of immediately responding to the poll request. If the back-end server 330 is to transmit data to the first client 310 and the second client 320, the back-end server 330 may transmit the data to the first client 310 and the second client 320 through the web server 340 as a poll reply to the poll request. For example, the back-end server 330 may transmit the required data to the web server 340 as the poll reply to the poll request, in order to apply a result of processing the normal requests of the first client 310 and the second client 320 to the first client 310 and the second client 320, or to control the first client 310 and the second client 320. The web server 340 may create webpage data for configuring a service screen to be displayed on the first client 310 and the second client 320 based on the received data, and may transmit the created webpage data to the first client 310 and the second client 320 as the poll reply.

The first client 310 and the second client 320 may maintain the connection with the back-end server 330 by processing the poll reply transferred through the web server 340 and by retransmitting the poll request to the web server 340. For example, in response to a first poll request transmitted from the first client 310 to the web server 340, the poll handler 342 of the web server 340 may manage the first poll request in association with the first client 310, and may transmit the first poll request to the back-end server 330. The back-end server 330 may be on standby without responding to the first poll request. In response to an occurrence of an event that the back-end server 330 has to transmit data to the first client 310, the back-end server 330 may transmit the corresponding data to the web server 340 through a first poll reply to the first poll request. The web server 340 may create webpage data for configuring a service screen based on the received data, and may transmit the created webpage data to the first client 310 through the first poll reply. The first client 310 may configure a service screen based on the webpage data and may display the service screen on a display screen, and may transmit a second poll request to the web server 340. The poll handler 342 of the web server 340 may manage the second poll request in association with the first client 310 and may transmit the second poll request to the back-end server 330. In this manner, a connection between the first client 310 and the back-end server 330 may be maintained.

A request handler 341 of the web server 340 may process normal requests of the first client 310 and the second client 320. For example, the request handler 341 may transfer the normal request received from each of the first client 310 and the second client 320 to the back-end server 330, may receive a normal reply to the normal request from the back-end server 330, and may transmit the normal reply to each of the first client 310 and the second client 320. Data for applying a processing result of the back-end server 330 associated with the normal request may be transmitted from the back-end server 330 to the web server 340 through the aforementioned poll reply.

Figure 4:
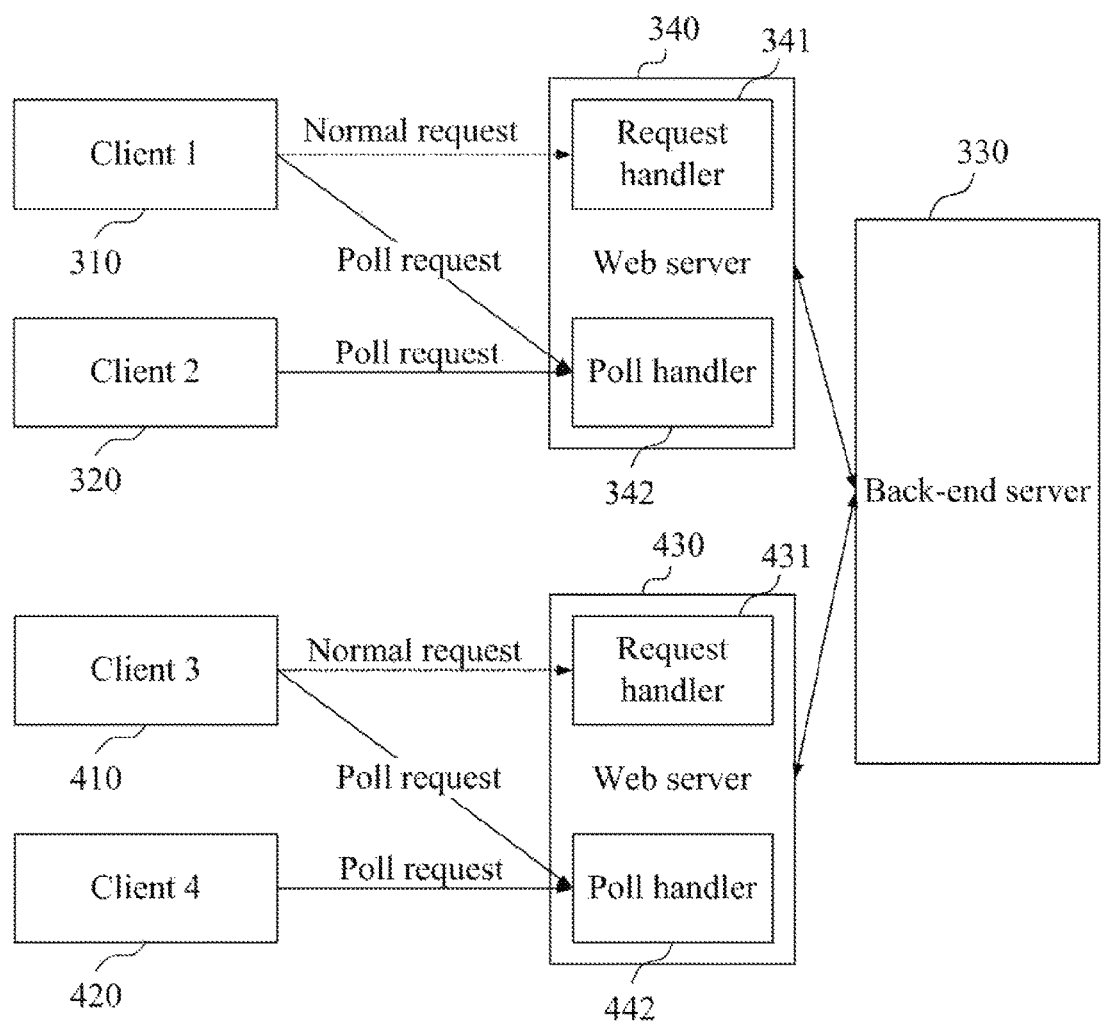
FIG. 4 is a block diagram of a client-server environment including a plurality of web servers, according to one or more exemplary embodiments.

FIG. 4 is a block diagram of a client-server environment including a plurality of web servers, according to one or more exemplary embodiments. That is, FIG. 4 illustrates an example in which a third client (e.g., client 3) 410 and a fourth client (e.g., client 4) 420 communicate with the back-end server 330 through a web server 430. According to one or more exemplary embodiments, since new clients, for example, the third client 410 and the fourth client 420, may be connected through a new web server, for example, the web server 430, the web server 430 may be installed in real time, e.g., dynamically. A request handler 431 and a poll handler 442 of the web server 430 may operate similarly to the request handler 341 and the poll handler 342 of the web server 340.

Also, as described above, the web servers 340 and 430 may create webpage data for a configuration of a service screen based on data of the back-end server 330, and may transmit the created webpage data to a client, e.g., at least one of the first through fourth clients 310, 320, 410, and 420. In this manner, and without a need to apply a server patch to each of the client programs of the first through fourth clients 310, 320, 410, and 420, or to terminate sessions of the web servers 340 and 430, a modification may be applied to each of the web servers 340 and 430. In addition, given that the back-end server 330 does not form an actual channel with the first through fourth clients 310, 320, 410, and 420, such as a socket connection, a protocol between the back-end server 330 and the web servers 340 and 430 may also be readily modified.

Figure 5:
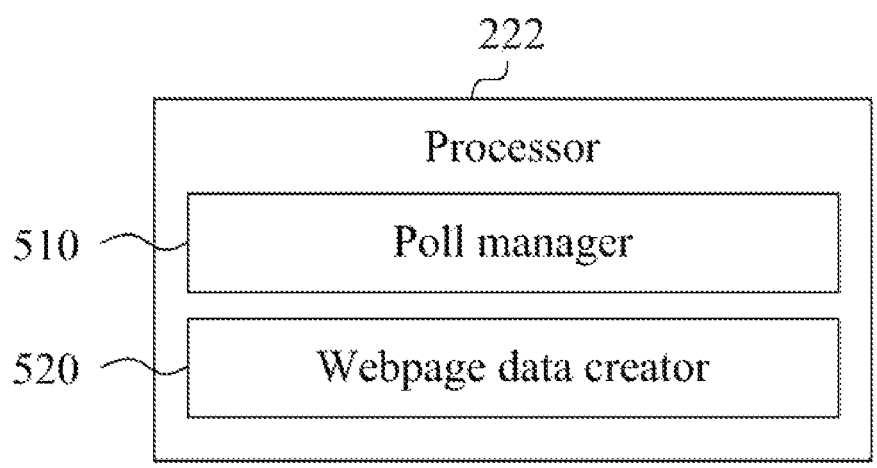
FIG. 5 is a block diagram of constituent elements of a processor of a web server, according to one or more exemplary embodiments.
Figure 6:
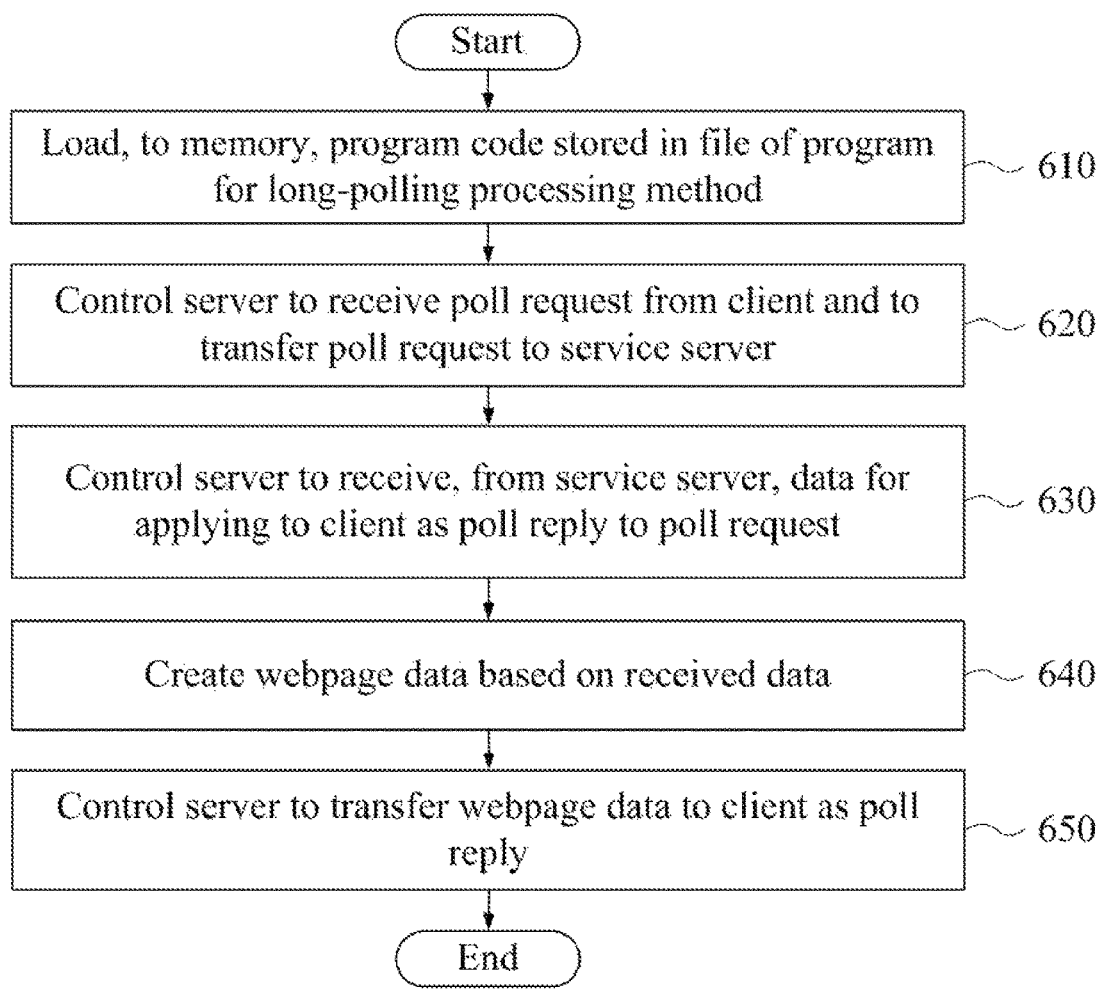
FIG. 6 is a flowchart of a web server process for long-polling, according to one or more exemplary embodiments.

FIG. 5 is a block diagram of constituent elements of a processor of a web server, according to one or more exemplary embodiments. FIG. 6 is a flowchart of a web server process for long-polling, according to one or more exemplary embodiments.

The server 150 described with reference to FIGS. 1 and 2 may correspond to the web server 340 of FIG. 3. The server 150 may process a long-polling between a client, for example, the electronic device 110, and a service server, for example, the server 160 that provides a service to the client over a network, e.g., the network 170. With reference to FIG. 5, the server processor 222 of the server 150 may include a poll manager 510 and a webpage data creator 520. The processor 222 and constituent elements included in the processor 222 may control the server 150 to perform operations 610 through 650 included in the long-polling processing method of FIG. 6. The processor 222 and the constituent elements of the processor 222 may be configured to execute instructions according to at least one program code and a code of the OS included in the memory 221. The constituent elements of the processor 222 may be representations of difference functions performed at the processor 222. For example, the poll manager 510 may be used as a functional representation so that the processor 222 controls the server 150 to receive a poll request in response to the aforementioned instruction.

In operation 610, the processor 222 may load, to the memory 221, a program code stored in a file of a program for the long-polling processing method. For example, the program may be a program installed in the server 150 to manage files used to provide a service and to load program code included in the files to the memory 221. In response to execution of a program installed on the server 150, the processor 222 may load program code from a file of the program to the memory 221.

Each of the processor 222, the poll manager 510, and the webpage data creator 520 may implement operations 620 to 650 by executing a portion, for example, an instruction, corresponding to a program code loaded to the memory 221. The processor 222 and constituent elements of the processor 222 may control the server 150 to implement, for instance, operations 620 to 650 of FIG. 6. For example, the processor 222 may control the communication module 223 included in the server 150 to enable the server 150 to communicate with a client, such as, for example, the plurality of electronic devices 110, 120, 130, and/or 140, or a service server, for example, the server 160.

In operation 620, the poll manager 510 may control the server 150 to receive a poll request from the client and to transfer the poll request to the service server, such as server 160. As described above, in response to execution of a client program or a poll reply received in response to a previous poll request, the poll manager 510 may transmit the poll request to the server 150 that is a web server using a web protocol. The poll manager 510 of the server 150 may receive the poll request and may transfer the poll request to the service server 160, and may manage the poll request in association with the corresponding client, such as, for example, electronic device 110. For instance, the poll manager 510 may associate and store an identifier of the poll request and an identifier of the client, e.g., an identifier of electronic device 110.

In operation 630, the poll manager 510 may control the server 150 to receive, from the service server 160, data for applying to the client as the poll reply to the poll request. As described above, the service server 160 may be on standby instead of responding to the poll request transferred from the server 150 in operation 620. If data to be transmitted to the client is present in the service server 160, the service server 160 may transmit the data to the server 150 as the poll reply to the poll request, and the server 150 may receive the data as the poll reply under control of the poll manager 510. If the service server 160 is on standby, and, thereby, configured to delay a transmission of the poll reply to the poll request transferred from the server 150, and to transmit data for applying a result of processing a normal request from the client to the client or data for controlling the client for a service, the service server 160 may transmit the data to the web server 150 as the poll reply.

In operation 640, the webpage data creator 520 may create webpage data based on the received data. Conventionally, the client may proceed with the service based on data received from the service server 160 and may display a service screen. According to one or more exemplary embodiments, however, the server 150 may create webpage data for configuring a service screen.

For example, the poll manager 510 may control the server 150 to receive a normal request from the client and transfer the normal request to the service server 160, to receive a normal reply according to processing of the normal request from the service server 160 and transfer the normal reply to the client. The poll manager 510 may also control the server 150 to receive, from the service server 160, data for applying a processing result of the service server 160 associated with the normal request to the client as the poll reply. In this manner, the server 150 may acquire the data for applying the processing result associated with the normal request of the client to the client, and the webpage data creator 520 may create webpage data for configuring a service screen to which the processing result of the service server 160 associated with the normal request is applied based on the corresponding data.

As another example, the poll manager 510 may control the server 150 to receive, from the service server 160, data used for the service server 160 to control the client as a poll reply. In this manner, the server 150 may acquire data regarding how the service server 160 is to control the client, and the webpage data creator 520 may create webpage data for configuring a service screen under control of the service server 160 based on the data. It is noted that the service may include a game service. As such, the webpage data may include data for configuring a game service screen to be displayed at the client, e.g., displayed at electronic device 110.

In operation 650, the poll manager 510 may control the server 150 to transfer the webpage data to the client as the poll reply. For example, the poll reply transmitted from the service server 160 may include an identifier of a corresponding poll request. In this manner, the poll manager 510 may search for an identifier of the client stored to correspond to the identifier of the poll request, and may control the server 150 to transmit the webpage data to the client associated with the identifier.

The client may receive the poll reply, and may proceed with a service by configuring and displaying the service screen based on the webpage data transferred as the poll reply. The webpage data may be created in a format of a source for configuring a webpage, and the client may configure and display the service screen based on the webpage data through a web browser. As another example, the client may configure and display the service screen based on the webpage data through a separate exclusive application.

As previously described, the client may configure and display only the service screen based on the provided webpage data without including or processing separate logic to proceed with the service. It is, therefore, possible to eliminate (or at least reduce) a hacking issue against the client itself when providing the service. In addition, the client may be provided with the service using a variety of methods, such as a web browser, an exclusive application, and the like. The client may be connected or reconnected to the service by transmitting the poll request to the server 150 that is a web server. As such, it is possible to achieve relatively excellent matching of connection or reconnection and easy reconstruction.

From the perspective of the server 150 (e.g., a web server), a server patch may be relatively easily applied in real time, e.g., dynamically applied. It is, therefore, possible to reduce update costs and to install an additional server in real time, e.g., dynamically, without taking down the service and/or other servers provisioning the service to which a new server is being dynamically added. Further, since a web expression method is employed, it is possible to relatively easily proceed with the development of a client in parallel and to provide a service through a relatively large number of web developers.

Figure 7:
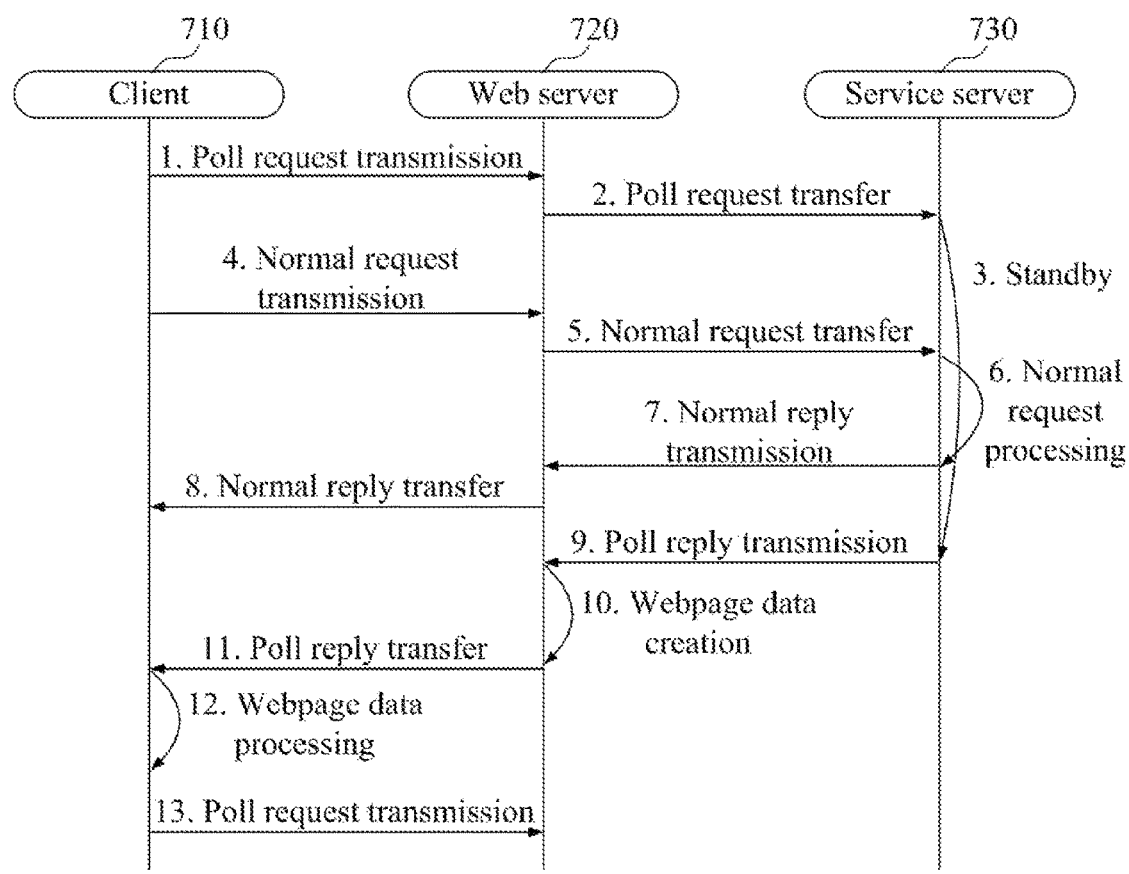
FIG. 7 is a call flow diagram of a long-polling process, according to one or more exemplary embodiments.

FIG. 7 is a call flow diagram of a long-polling process, according to one or more exemplary embodiments. That is, FIG. 7 illustrates an example of a data processing and transmission process among a client 710, a web server 720, and a service server 730. It is noted that the client 710 may correspond to one of electronic devices 110, 120, 130, and 140; web server 720 may correspond to server 150; and service server 730 may correspond to server 160.

In step 1, a poll request transmission process may be a process in which the client 710 transmits a poll request to the web server 720 through a web protocol. In response to execution of a client program or reception of a poll reply to a previous poll request, the client 710 may transmit the poll request to the web server 720.

At step 2, a poll request transfer process may be a process in which the web server 720 transfers the poll request through a communication protocol set between the web server 720 and the service server 730. It is noted that any suitable communication protocol may be utilized for access of the client 710, and, thus, may be readily changed in association with exemplary embodiments.

Per step 3, a standby process may be a process in which the service server 730 is on standby without responding to the transferred poll request. It may indicate that the service server 730 is on standby until the service server 730 has to transmit a poll reply to the poll request due to a necessity of transferring data to the client 710. Accordingly, it may indicate that a virtual channel is formed between the client 710 and the service server 730 due to the poll request.

In step 4, a normal request transmission process may be a process in which the client 710 transmits a normal request for requesting a service from the service server 730 to the web server 720. The normal request may be a message for a variety of requests associated with the progress of a service, and may be transmitted to the web server 720 using a web protocol different from the web protocol used to transmit the poll request.

At step 5, a normal request transfer process may be a process in which the web server 720 transfers the normal request to the service server 730. The service server 730 may detect transfer of the normal request as the occurrence of a specific event.

Per step 6, a normal request processing process may be a process in which the service server 730 processes the normal request.

In step 7, a normal reply transmission process may be a process in which the service server 730 initially transmits a normal reply to the web server 720 in order to transmit the normal reply to the client 710 as a response to the normal request.

At step 8, a normal reply transfer process may be a process in which the web server 720 transfers the normal reply received from the service server 730 to the client 710.

Per step 9, a poll reply transmission process may be a process in which the service server 730 transmits a poll reply to the transferred poll request to the web server 720. The poll reply may include data for applying a result of processing the normal request to the client 710.

In step 10, a webpage data creation process may be a process in which the web server 720 creates webpage data for configuring a service screen to which the result of processing the normal request is applied, based on the data transmitted as the poll reply.

At step 11, a poll reply transfer process may be a process in which the web server 720 transfers the created webpage data to the client 710 as a poll reply.

Per step 12, a webpage data processing process may be a process in which the client 710 configures and displays a service screen based on the webpage data.

In step 13, a poll request transmission process may be the same process as performed in step 1, e.g., a poll request transmission process.

Figure 8:
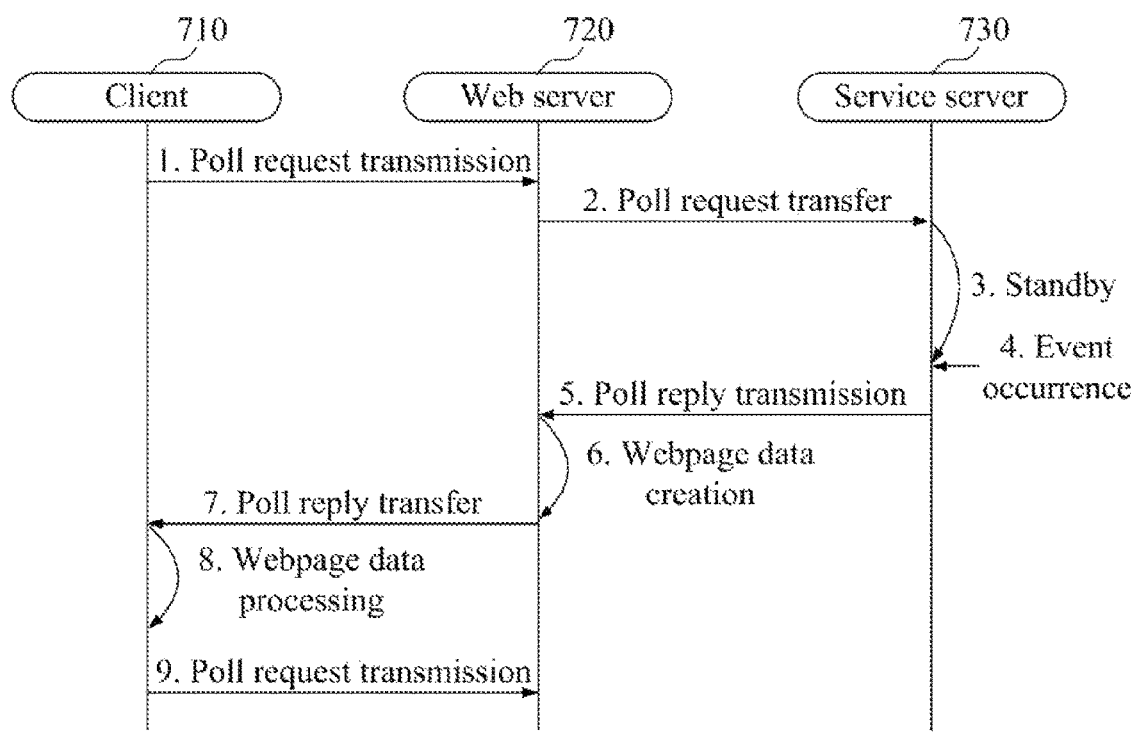
FIG. 8 is a call diagram of a long-polling process, according to one or more exemplary embodiments.

FIG. 8 is a call diagram of a long-polling process, according to one or more exemplary embodiments. That is, FIG. 8 illustrates an example of a data processing and transmission process among a client 710, a web server 720, and a service server 730. It is noted that the client 710 may correspond to one of electronic devices 110, 120, 130, and 140; web server 720 may correspond to server 150; and service server 730 may correspond to server 160

In step 1, a poll request transmission process may be a process in which the client 710 transmits a poll request to the web server 720 through a web protocol. In response to execution of a client program or reception of a poll reply to a previous poll request, the client 710 may transmit the poll request to the web server 720.

At step 2, a poll request transfer process may be a process in which the web server 720 transfers the poll request through a communication protocol set between the web server 720 and the service server 730. It is noted that the communication protocol may be any suitable communication protocol for access of the client 710, and, thus, may be readily changed in association with exemplary embodiments.

Per step 3, a standby process may be a process in which the service server 730 is on standby without responding to the transferred poll request. It may indicate that the service server 730 is on standby until the service server 730 has to transmit a poll reply to the poll request due to a necessity of transferring data to the client 710. Accordingly, it may indicate that a virtual channel is formed between the client 710 and the service server 730 due to the poll request.

In step 4, an event occurrence process may be a process in which an event for transmitting data used for the service server 730 to control the client 710 occurs.

At step 5, a poll reply transmission process may be a process in which the service server 730 transmits data corresponding to the event to the web server 720 as a poll reply. That is, even without a request from the client 710, the service server 730 may transmit data for controlling the client 710 through the poll reply to the poll request at any time.

Steps 6 through 9 may be performed in the same manner as the aforementioned processes 10 through 13 of FIG. 7. As such, a duplicative description is omitted to avoid obscuring exemplary embodiments.

According to one or more exemplary embodiments, a web server may create webpage data for a configuration of a service screen by processing a long-polling between a client and a service server that provides a service to the client over a network, and may provide the created webpage data to the client. Accordingly, it is possible to eliminate (or at least reduce) a hacking issue against the client itself, to relatively easily install an additional patch and server in real time, e.g., dynamically, and to readily modify a protocol at a service server.

In one or more exemplary embodiments, functional blocks, units, and/or modules described herein may be implemented using hardware components, software components, firmware components, or a combination thereof. For example, a processing device may be implemented using one or more general-purpose or special purpose computers, such as, for example, a processor, a controller and arithmetic logic unit, a digital signal processor, an application specific integrated circuit, a microcomputer, a field programmable array, a programmable logic unit, a microprocessor, and/or any other device capable of responding to and executing instructions in a defined manner. The processing device may run an operating system (OS) and one or more software applications that run on the OS. The processing device may also access, store, manipulate, process, and create data in response to execution of the software. For the purpose of simplicity, the description of a processing device has been in the singular; however, one skilled in the art will appreciate that a processing device may include multiple processing elements and multiple types of processing elements. For example, a processing device may include multiple processors or a processor and a controller. In addition, different processing configurations are possible, such as parallel processors.

According to one or more exemplary embodiments, software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

It is also contemplated that one or more exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the art of the present disclosure. Non-transitory computer-readable media may include, but are not limited to, magnetic media, such as hard disks, floppy disks, and magnetic tape; optical media, such as CD ROM disks and DVD; magneto-optical media, such as floptical disks; and hardware devices that are specially configured to store and perform program instructions, such as read-only memory (ROM), random access memory (RAM), flash memory, and the like. Program instructions may include, but are not limited to, both machine code, such as produced by a compiler, and files containing higher level code that may be executed by a computer using an interpreter. The described hardware devices may be configured to act as one or more software modules in order to perform the operations of one or more exemplary embodiments.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method of processing, at a web server, a long-polling between a client and a service server configured to provision a service to the client over a network, the method comprising:
　receiving, at the web server, a poll request from the client;
　transmitting, via the web server, the poll request to the service server, the poll request comprising a request for maintaining a connection between the web server and the service server;
　receiving, at the web server, a normal request different from the poll request from the client;
　transmitting, via the web server, the normal request to the service server;
　receiving, at the web server, a normal reply to the normal request from the service server;
　transmitting, via the web server, the normal reply to the client;
　receiving, at the web server, a poll reply to the poll request from the service server, the poll reply comprising data for reflecting a processing result of the service server with respect to the normal request from the client;
　generating, at the web server, webpage data based on the data comprised in the poll reply; and
　transmitting, via the web server, the webpage data to the client as the poll reply.

2. The method of claim 1, wherein:
　the service comprises a game service; and
　the webpage data comprises data to configure a game service screen at the client.

3. The method of claim 1, wherein, in response to a standby mode, the service server is configured to delay transmission of the poll reply to the poll request.

4. The method of claim 1, wherein:
　the service server is configured to process the normal request to generate the processing result; and
　the data in the poll reply received at the web server comprises data to apply the result in association with the client.

5. The method of claim 1, wherein the data in the poll reply received at the web server comprises data used by the service server to control the client.

6. The method of claim 1, further comprising:
　receiving, at the web server in response to reception of the poll reply by the client, a retransmission of the poll request from the client; and
　transmitting, via the web server, the retransmitted poll request to the service server.

7. A non-transitory computer-readable storage medium comprising one or more sequences of one or more instructions that, in response to being executed, cause at least one apparatus to implement the method of claim 1.

8. A long-polling processing system of a web server configured to process a long-polling between a client and a service server configured to provision a service to the client over a network, the long-polling processing system comprising:
　at least one processor; and
　at least one memory comprising one or more sequences of one or more instructions that, in response to being executed by the at least one processor, cause the long-polling processing system at least to:
　control the web server to receive a poll request from the client;
　control the web server to transmit the poll request to the service server, the poll request comprising a request for maintaining a connection between the web server and the service server;
　control the web server to receive a normal request different from the poll request from the client;
　control the web server to transmit the normal request to the service server;
　control the web server to receive, from the service server, a normal reply to the normal request;
　control the web server to transmit the normal reply to the client;
　control the web server to receive a poll reply to the poll request from the service server, the poll reply comprising data for reflecting a processing result of the service server with respect to the normal request from the client;

control the web server to generate webpage data based on the data comprised in the poll reply; and
control the web server to transmit the webpage data to the client as the poll reply.

9. The long-polling processing system of claim 8, wherein:
the service comprises a game service; and
the webpage data comprises data to configure a game service screen at the client.

10. The long-polling processing system of claim 8, wherein, in response to being in a standby mode, the service server is configured to delay transmission of the poll reply to the poll request.

11. The long-polling processing system of claim 8, wherein:
the service server is configured to process the normal request to generate the processing result; and
the data in the poll reply received at the web server comprises data to apply the result in association with the client.

12. The long-polling processing system of claim 8, wherein the data in the poll reply received at the web server comprises data used by the service server to control the client.

13. The long-polling processing system of claim 8, wherein the long-polling processing system is further caused at least to:
control the web server to receive, in response to reception of the poll reply by the client, a retransmission of the poll request from the client; and
control the web server to transmit the retransmitted poll request to the service server.

14. The method of claim 3, wherein, in response to generation of data corresponding to the processing result of processing the normal request from the client, the service server is configured to transmit the poll reply to the web server comprising the data corresponding to the processing result.

15. The long-polling processing system of claim 10, wherein, in response to generation of data corresponding to the processing result of processing the normal request from the client, the service server is configured to transmit the poll reply to the web server comprising the data corresponding to the processing result.

16. The method of claim 5, wherein, in response to generation of data to control the client in association with the provision of the service to the client, the service server is configured to transmit the poll reply to the web server comprising the data to control the client.

17. The long-polling processing system of claim 12, wherein, in response to generation of data to control the client in association with the provision of the service to the client, the service server is configured to transmit the poll reply to the web server comprising the data to control the client.

18. The method of claim 6, further comprising:
receiving, at the client, the poll reply comprising the webpage data;
processing, at the client, the webpage data to display a service screen; and
retransmitting, via the client, the poll request to the web server in response to receiving the poll reply.

19. The long-polling processing system of claim 13, wherein the client is configured to:
receive the poll reply comprising the webpage data;
process the webpage data to display a service screen; and
retransmit, in response to reception of the poll reply, the poll request to the web server.

20. The method of claim 1, further comprising:
installing, while the web server remains in session with the service server, another web server to provision the service in association with the web server and the service server.

* * * * *